United States Patent
Avner et al.

(10) Patent No.: US 9,444,581 B2
(45) Date of Patent: Sep. 13, 2016

(54) INTEGRATION OF VITERBI ALGORITHM WITH DECISION FEEDBACK EQUALIZATION

(71) Applicant: Apple Inc., Cupertino, CA (US)

(72) Inventors: Yuval Avner, Haifa (IL); Gilad Kirshenberg, Raanana (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/560,012

(22) Filed: Dec. 4, 2014

(65) Prior Publication Data

US 2016/0164633 A1    Jun. 9, 2016

(51) Int. Cl.
*H04L 1/00* (2006.01)
*H04L 25/03* (2006.01)

(52) U.S. Cl.
CPC ....... *H04L 1/0054* (2013.01); *H04L 25/03057* (2013.01)

(58) Field of Classification Search
USPC ................. 375/233, 295, 219, 232
See application file for complete search history.

(56) References Cited

U.S. PATENT DOCUMENTS

| | | | |
|---|---|---|---|
| 6,553,518 B1 | 4/2003 | Ware et al. | |
| 7,418,034 B2 | 8/2008 | Xia et al. | |
| 7,613,238 B2 | 11/2009 | Chang | |
| 2009/0238255 A1 | 9/2009 | Chau et al. | |
| 2010/0034253 A1* | 2/2010 | Cohen | H04L 25/0212 375/232 |
| 2010/0074310 A1* | 3/2010 | Roo | H04B 1/581 375/219 |
| 2011/0033009 A1* | 2/2011 | Betts | H04L 1/0006 375/295 |

* cited by examiner

*Primary Examiner* — Eva Puente
(74) *Attorney, Agent, or Firm* — Meyertons Hood Kivlin Kowert & Goetzel, P.C.; Jeffrey C. Hood; Mark K. Brightwell

(57) ABSTRACT

A modified Viterbi algorithm, that integrates decision feedback equalization (DFE), is disclosed. The modified algorithm may be used especially for rate ½ coded transmissions through additive noise channels, where the additive noise is one-tap filtered noise. Each state in the presently-disclosed trellis holds an aggregate error and an aggregate weight of the winner path terminating at that state. Each branch of the trellis carries one or more aggregate errors, where each of the aggregate errors includes a contribution from the aggregate error of the branch's source state as well as a contribution from the difference between an expected symbol of the branch and a corresponding received symbol.

20 Claims, 16 Drawing Sheets

INTEGRATION OF VITERBI ALGORITHM WITH DECISION FEEDBACK EQUALIZATION

FIELD

The present application relates to the field of telecommunication, and more particularly, to receiver mechanisms for integrating the Viterbi algorithm with decision feedback equalization (DFE) in the context of coded 2/4-PAM and colored noise. (PAM is an acronym for Pulse Amplitude Modulation.)

DESCRIPTION OF THE RELATED ART

In the situation where a transmitter transmits an information bit stream without coding, i.e., by directly mapping information bits to channel symbols, a receiver may employ decision feedback equalization (DFE) to recover estimates of the transmitted symbols, and thus, estimates of the transmitted bits.

In situations where the transmitter encodes the information bit stream with a binary convolutional code (BCC) and maps the coded bits to channel symbols, the receiver may employ the Viterbi algorithm to recover an estimate of the information bit stream. However, the Viterbi algorithm is not optimal when the channel noise is colored, e.g., colored by a one-tap FIR filter. Such colored noise naturally arises in many different contexts.

It would be desirable to have a decoding mechanism that could jointly perform Viterbi decoding and DFE, to gain from the advantages of both methods. However, a naïve concatenation of the two algorithms is not implementable due to the latency between traceback of the decoder and the DFE input.

SUMMARY

In one set of embodiments, a receiver may jointly perform Viterbi decoding and decision feedback equalization as follows.

Digital circuitry of the receiver may receive an input signal, e.g., a sampled baseband signal.

The digital circuitry may determine an aggregate weight (AW) and an aggregate error (AE) for a given state at a current time step in a trellis. The AW and AE may be used to recover information from the input signal. The trellis is defined by a binary convolutional code of rate ½ and a 4-point mapping.

The action of determining the AW and AE for the given state may include the following operations. (1) The digital circuitry may compute a first AE candidate for a first edge connecting a first previous state of the trellis to the given state, wherein said first AE candidate is computed by adding a constant times an aggregate error of the first previous state to a first error for the first edge, wherein the first error is determined by a current symbol of the input signal and a symbol associated with the first edge. (2) The digital circuitry may compute a second AE candidate for a second edge connecting a second previous state of the trellis to the given state, wherein said second AE candidate is computed by adding the constant times an aggregate error of the second previous state to a second error for the second edge, wherein the second error is determined by the current symbol and a symbol associated with the second edge. (3) The digital circuitry may compute a first AW candidate by adding a non-negative function of the first AE candidate to an aggregate weight of the first previous state. The non-negative function of the first AE candidate may be an increasing function of the absolute value of the first AE candidate. (4) The digital circuitry may compute a second AW candidate by adding a non-negative function of the second AE candidate to an aggregate weight of the second previous state. The non-negative function of the second AE candidate may be an increasing function of the absolute value of the second AE candidate. (5) The digital circuitry may select the minimum of the first AW candidate and the second AW candidate to be the AW of the given state. (6) The digital circuitry may select either the first AE candidate or the second AE candidate to be the AE for the given state based on which of the first edge or second edge corresponds to said minimum.

In one set of embodiments, a receiver may jointly perform Viterbi decoding and decision feedback equalization as follows.

Digital circuitry of the receiver may receive an input signal.

The digital circuitry may determine an aggregate weight (AW) and an aggregate error (AE) for a given state at a current time step in a trellis. The AW and the AE may be used to recover information from the input signal. The trellis is defined by a binary convolutional code of rate ½ and a BPSK mapping.

The action of determining the AW and AE for the given state may include the following operations. (1) The digital circuitry may compute a first intermediate AE for a first edge connecting a first previous state of the trellis to the given state, wherein said first intermediate AE is computed by adding a constant times an aggregate error of the first previous state to a first error for the first edge, wherein the first error for the first edge is determined by a first current symbol of the input signal and a first symbol associated with the first edge. (2) The digital circuitry may compute a first AE candidate for a first edge by adding a constant times the first intermediate AE to a second error for the first edge, wherein the second error for the first edge is determined by a second current symbol of the input signal and a second symbol associated with the first edge. (3) The digital circuitry may compute a second intermediate AE for a second edge connecting a second previous state of the trellis to the given state, wherein said second intermediate AE is computed by adding a constant times an aggregate error of the second previous state to a first error for the second edge, wherein the first error for the second edge is determined by the first current symbol of the input signal and a first symbol associated with the second edge. (4) The digital circuitry may compute a second AE candidate for the second edge by adding a constant times the second intermediate AE to a second error for the second edge, wherein the second error for the second edge is determined by the second current symbol of the input signal and a second symbol associated with the second edge. (5) The digital circuitry may compute the AW and the AE for the given state based on the first intermediate AE, the first AE candidate, the second intermediate AE and the second AE candidate.

In some embodiments, the computation of the AW and AE for the given state may include: (a) computing a first AW candidate by adding a non-negative function of the first intermediate AE and a non-negative function of the first AE candidate to an aggregate weight of the first previous state; (b) computing a second AW candidate by adding a non-negative function of the second intermediate AE and a non-negative function of the second AE candidate to an aggregate weight of the second previous state; (c) selecting the minimum of the first AW candidate and the second AW candidate to be the AW of the given state; and (d) selecting either the first AE candidate or the second AE candidate to be the AE for the given state based on which of the first edge or second edge corresponds to said minimum.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
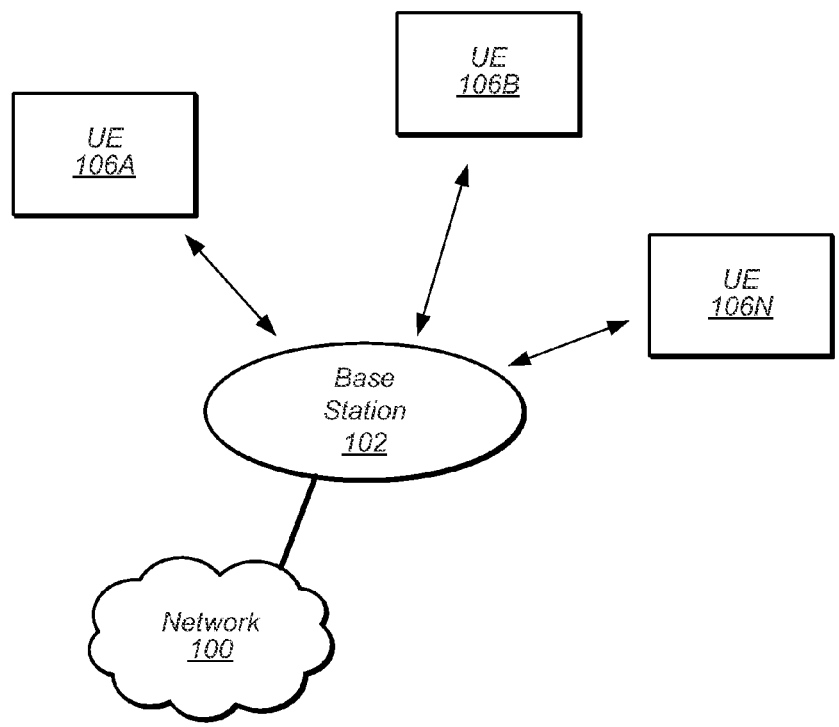
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

List of Acronyms Used in this Disclosure

ACS: Add Compare Select
AWGN: Additive White Gaussian Noise
BCC: Binary Convolutional Code
BPSK: Binary Phase Shift Keying
DFE: Decision Feedback equalization
DQPSK: Differential QPSK
FIR: Finite Impulse Response
FSM: Finite State Machine
ISI: Inter symbol Interference
ML: Maximum Likelihood
PAM: Pulse Amplitude Modulation
PER: Packet Error Rate
QPSK: Quadrature PSK
MLSE: Maximum Likelihood Sequence Estimation
VA: Viterbi Algorithm Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, wearable devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates one embodiment of a wireless communication system. It is noted that FIG. 1 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX, Bluetooth, etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells, e.g., cells provided by other base stations (which may be referred to as "neighboring cells"). Such cells may also be capable of facilitating communication between user devices and/or between user devices and the network 100.

Note that at least in some instances a UE device 106 may be capable of communicating using a plurality of wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
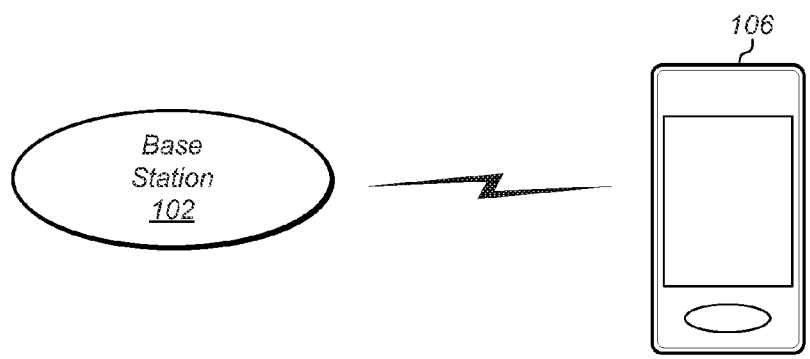
FIG. 2 illustrates a base station ("BS", or in the context of LTE, an "eNodeB" or "eNB") in communication with a wireless device.

FIG. 2 illustrates UE device 106 (e.g., one of the devices 106A through 106N) in communication with base station 102. The UE device 106 may have cellular communication capability, and as described above, may be a device such as a mobile phone, a hand-held device, a media player, a computer, a laptop or a tablet, a wearable device, or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array) that is configured to perform any of the method embodiments described herein, or any portion of any of the method embodiments described herein.

In some embodiments, the UE device 106 may be configured to communicate using any of a plurality of radio access technologies and/or wireless communication protocols. For example, the UE device 106 may be configured to communicate using one or more of GSM, UMTS, CDMA2000, LTE, LTE-A, WLAN, Wi-Fi, WiMAX, Bluetooth or GNSS. Other combinations of wireless communication technologies are also possible.

The UE device 106 may include one or more antennas for communicating using one or more wireless communication protocols or technologies. In one embodiment, the UE device 106 might be configured to communicate using a single shared radio. The shared radio may couple to a single antenna, or may couple to a plurality of antennas (e.g., for MIMO operation) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 3:
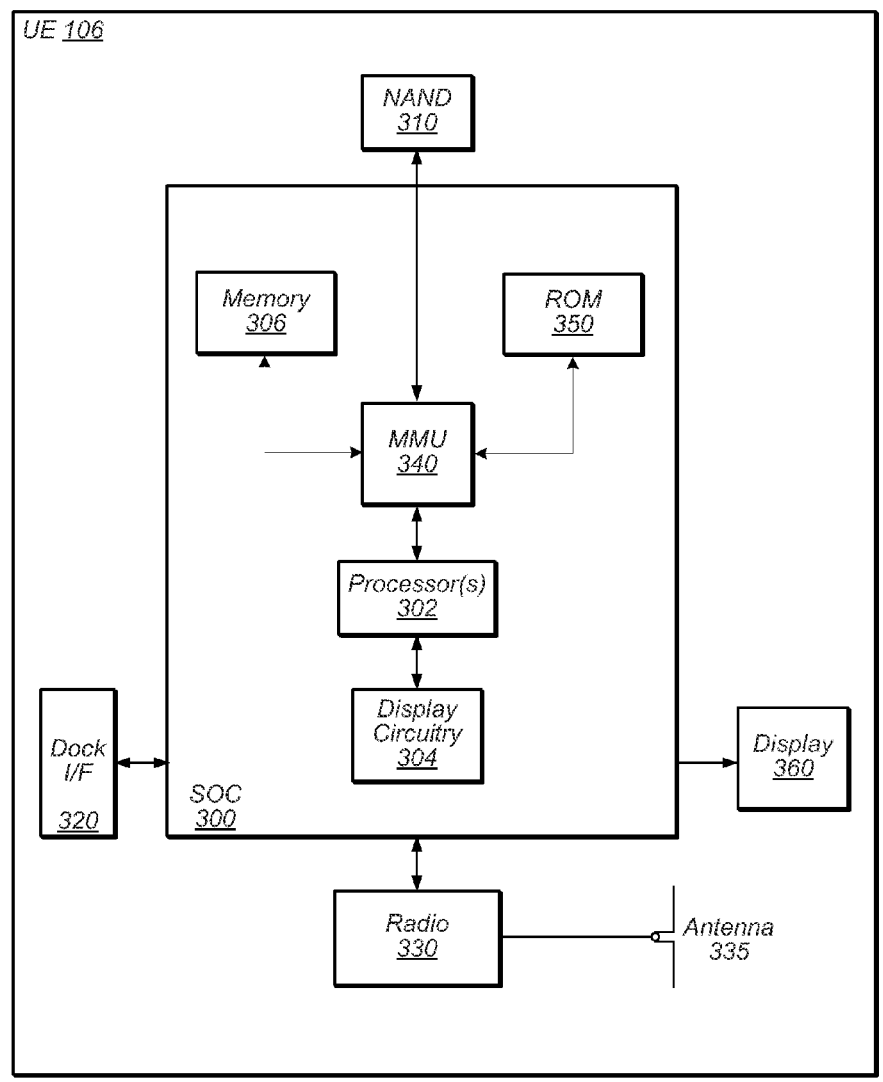
FIG. 3 illustrates a block diagram for one possible implementation of a wireless user equipment (UE) device.

FIG. 3—Example Block Diagram of a UE

FIG. 3 illustrates one possible block diagram of a UE 106. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 360.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 360, and wireless communication circuitry (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and/or software components for dynamically controlling the extent of signal processing fidelity of the radio 330 (e.g., a receiver and/or transmitter of the radio 330) according to embodiments disclosed herein.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), and/or, as an ASIC (Application Specific Integrated Circuit).

Figure 4:
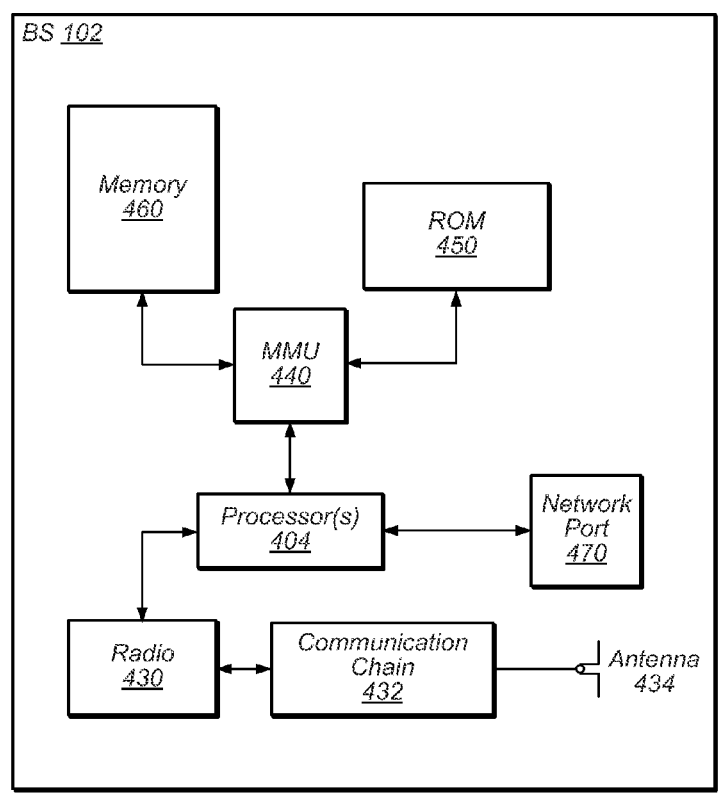
FIG. 4 illustrates a block diagram for one possible embodiment of a base station.

FIG. 4—Base Station

FIG. 4 illustrates one embodiment of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Combined Viterbi DFE

The well-known Viterbi algorithm (VA) is an optimal method for decoding convolutional code at the output of an AWGN channel. In this patent, we disclose (among other things) a modification of the VA for the case in which the noise is not white, but colored by a one-tap delay filter. It can be shown that optimality is achieved in the case where the number of states increases at each time step and in the case where the optimal $a_k$ is employed. Significant improvement in performance is achieved even in the case where the original number of states is maintained.

Decision Feedback Equalization (DFE) for Non-Coded Transmission

Figure 5A:
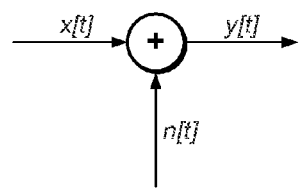
FIG. 5A illustrates an addition noise channel according to one embodiment.

Consider the channel model shown in FIG. 5A. A signal x[t] is transmitted onto a channel by a transmitter. The signal y[t] received at the receiver may be modeled by $$y[t]=x[t]+n[t],$$

where n[t] is a noise signal. The noise signal n[t] may be modeled according to the relation $$n[t]=w[t]-w[t-1],$$

or more generally, by the relation $$n[t]=w[t]-c*w[t-T],$$

where c is a non-zero real constant, and w[t] is AWGN, wherein T is a nonzero constant (e.g., a positive constant). In other words, n[t] may be modeled as one-tap filtered AWGN.

Figure 5B:
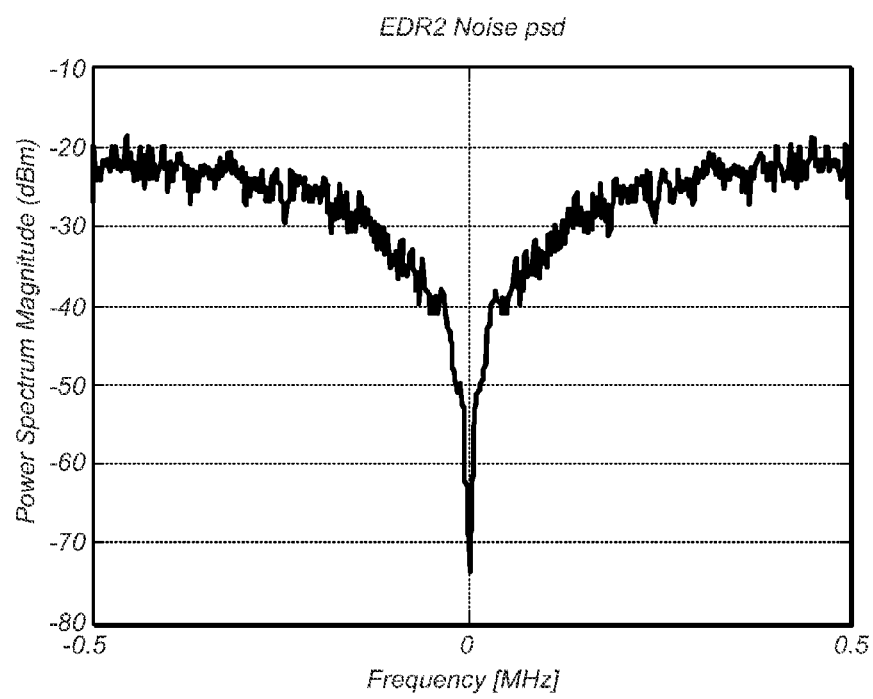
FIG. 5B illustrates the power spectral density of one tap filtered AWGN.

FIG. 5B shows the power spectral density of noise n[t] as a function of frequency (relative to the center of the receive bandwidth) in the case where T=1 and k=1. This type of noise may be relevant for the Bluetooth EDR2 standard. EDR is an acronym for Enhanced Data Rate.

Figure 6A:
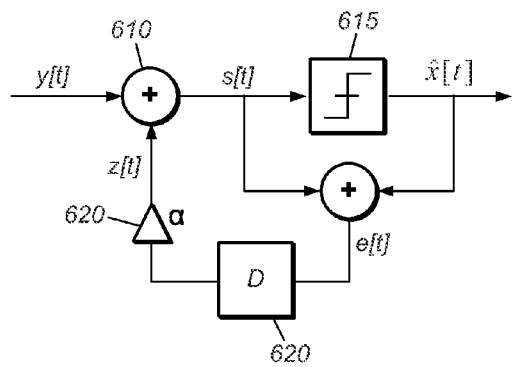
FIG. 6A illustrates one embodiment of a decision feedback equalization scheme for an uncoded transmission.

The DFE scheme that naturally suits this channel model is given in FIG. 6A. The DFE scheme operates within the receiver. The received signal y[t] is added to a feedback signal z[t] by adder 610 to obtain a sum signal s[t]=x[t]+z[t]. The sum signal is subjected to hard decision demodulation at block 615, thus obtaining demodulated signal $\hat{x}$[t]. Unit 615 generates error signal e[t] by subtracting the demodulated signal $\hat{x}$[t] from the sum signal s[t]. The error signal e[t] is delayed by delay unit 620 to obtain a delayed signal e[t−T]. The delayed signal is then multiplied by a constant α to obtain the feedback signal z[t].

Figure 6B:
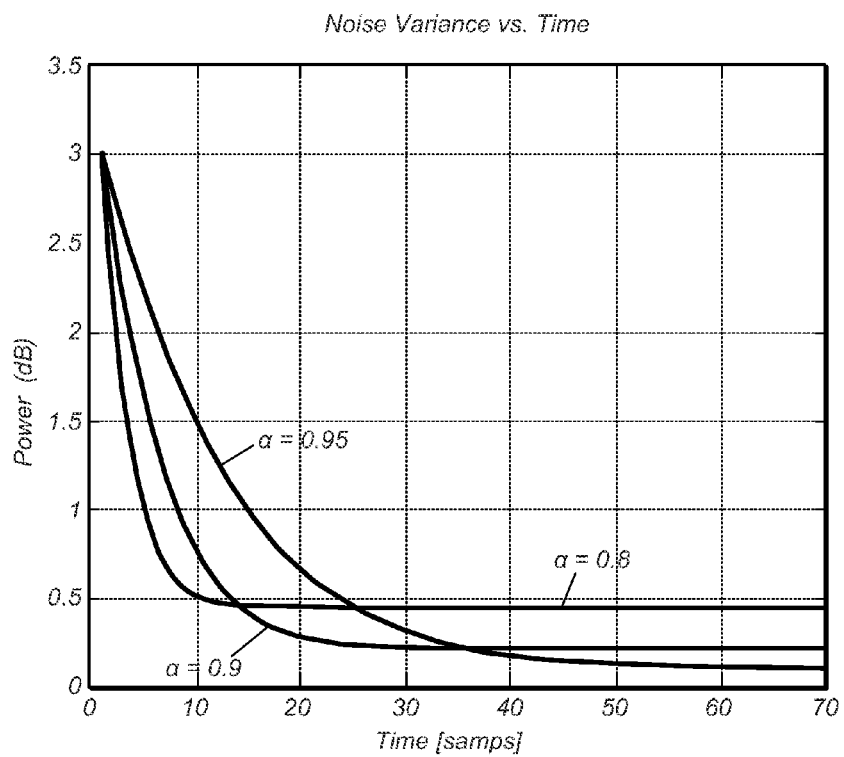
FIG. 6B illustrates noise variance vs. time for the DFE of FIG. 6A, with $\alpha=0.8$, 0.9 and 0.95.

The parameter a introduces a tradeoff between time of convergence and steady state noise power, as shown in FIG. 6B. For example, consider the case c=1. (When mentioning actual values, all numbers here are relevant to the case c=1. We refer to the general case in the expression for $a_k$ given hereinafter.) As a approaches one (via values less than one), the steady state noise power decreases, but time of convergence increases. FIG. 6A presents graphs of noise power versus time index for α equal to 0.85, 0.9 and 0.95.

Strictly speaking, one might expect a to be equal to 1. However, this makes the receiver system very sensitive to initial conditions. When choosing α=1, the noise component $w_0$ is carried perfectly along the packet. Thus, α=1 is valid only if one knows that $W_0$=0. In this case, α=1 (or α=c in the context described below) is truly optimal. The optimal value of α (from the point of view of packet error rate) is given below, and actually changes with time.

1. Integration of DFE Mechanism with Coded Transmission

In this section, we disclose a Viterbi decoding algorithm that is integrated with DFE. The integrated algorithm may operate in the phase domain, and has implementations for both 4PAM and BPSK coded transmission. (The transmitter operates on an information bit stream with a BCC, and the resulting coded bits are then mapped to transmission symbols using 4PAM or BPSK.) The concept is identical for both of these coded transmission types, however the implementation should be somewhat different. The reason for the difference in implementation is due to the fact that, in BPSK each data bit implies two channel uses while in 4PAM each data bit implies one channel use.

This section is valid for any binary convolutional code (BCC) of rate R=½.

1.1 Modulation with Two Bits Per Symbol

This section discusses the Viterbi-DFE technique for any case where the transmitter uses a modulation with two bits per symbol (e.g. 4-PAM, phase domain DQPSK, etc.). In other words, each transmitted symbols represents two bits.

Figure 7:
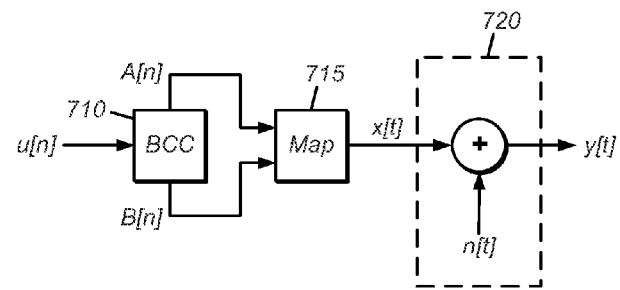
FIG. 7 illustrates one embodiment of a transmitter having a rate ½ encoder and a mapper that uses 2 bit per symbol.

Consider the transmitter and its concatenation to the channel as shown in FIG. 7. The transmitter includes a BCC 710 of rate ½, and a mapper 715 that uses two bits per symbols. Thus, at each time step n, the BCC receives information bit u[n], and generates output bits A[n] and B[n]. The mapper 715 maps the bit pair (A[n],B[n]) to a corresponding symbol from a set of four symbols. The mapper-generated symbol is then transmitted onto the channel 720.

Figure 8:
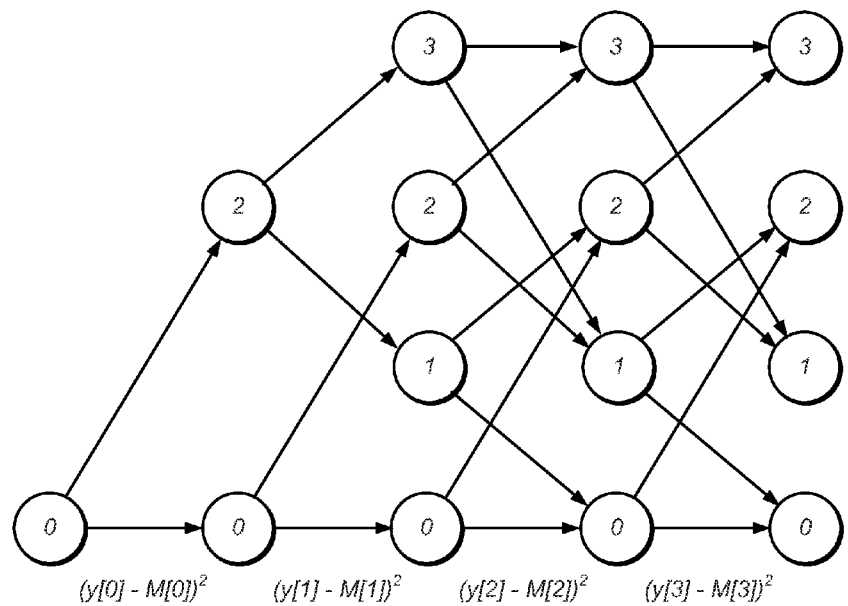
FIG. 8 illustrates a trellis that might be used for symbol domain decoding under Additive White Gaussian Noise (AWGN) in the channel.

If the noise n[t] were white, the symbol-domain trellis would take the form shown in FIG. 8. In FIG. 8, we use the notation M[0]=M(A[0],B[0]) and so on.

Turning now to the DFE mechanism, let the integer time index n run from 0 to K, where K is the number of bits in the original bit sequence {u[n]}.

In a standard Viterbi Algorithm (VA) over a trellis, every state of the trellis represents a state of the BCC. Furthermore, every branch b (also referred to as an edge or a vertex) has a corresponding source state, a corresponding terminal state, an associated input bit value u(b) and an associated channel symbol M(b). The terminal state is the state that results when the BCC is residing in the source state and receives the input bit value u(b) as input. The channel symbol M(b) is the channel symbol that results when the BCC is residing in the source state and receives the input bit value u(b) as input.

Adding time instances to the notation M(b), we denote the symbol associated with a branch b terminating on a state at time t by M(b,t). Obviously, M(b,t) is time invariant. The error of a branch b that terminates on a state at time t is $$e(b,t)=y[t]-M(b,t).$$

The weight of the branch is $e^2(b,t)$.

Each state of the trellis holds: a corresponding winning path (through the trellis) that terminates on the state; and a corresponding aggregate weight of the winning path. The aggregate weight of any trellis path is the sum of the weights of the branches along the path.

Each state s at time t is entered by two branches. Each branch b of the two branches carries the following information:

the error e(b,t) of the branch as specified above; and
the aggregate weight g(s,t−1) of the winning path that terminates on the source state of the branch.

(The source state of a branch is the state from which the branch starts.) Thus, there are two candidates for the winning path at state s, i.e., one candidate that flows through the first branch terminating at s, and another candidate that flows through the second branch terminating at s.

At the entrance of the state s, an add-compare-select (ACS) operation is performed, in which only the candidate path with minimal aggregate weight survives. That surviving path is the winning path for state s. At the last time step of the trellis, the winning path of the state with the smallest aggregate weight (among all the states at the last time step) represents the maximum likelihood (ML) detection of the transmitted bit sequence {u[n]}.

We propose the following modifications.

(1) In addition to the above, each state of the trellis holds an aggregate error of the winning path terminating on the state. (There is nothing in the standard Viterbi algorithm that is analogous to this aggregate error.)

(2) The error of a branch has a modified definition, i.e., not the same as the branch error of the standard Viterbi algorithm. In particular, given a branch b emerging from a state s at time t−1, the branch's error is given by:

$$E(b,t)=y[t]-M(b,t)+a*E(s,t-1),$$

where a is a non-zero real constant, where y[t] is the received symbol at time t, where M(b,t) is the symbol associated with the branch b, where E(s,t−1) is the aggregate error associated with the source state s of the branch. In some embodiments, the value of parameter a may change over time. In other words, there is no general requirement that it remain constant over time.

Graphical Representation of the Concept

Figure 9:
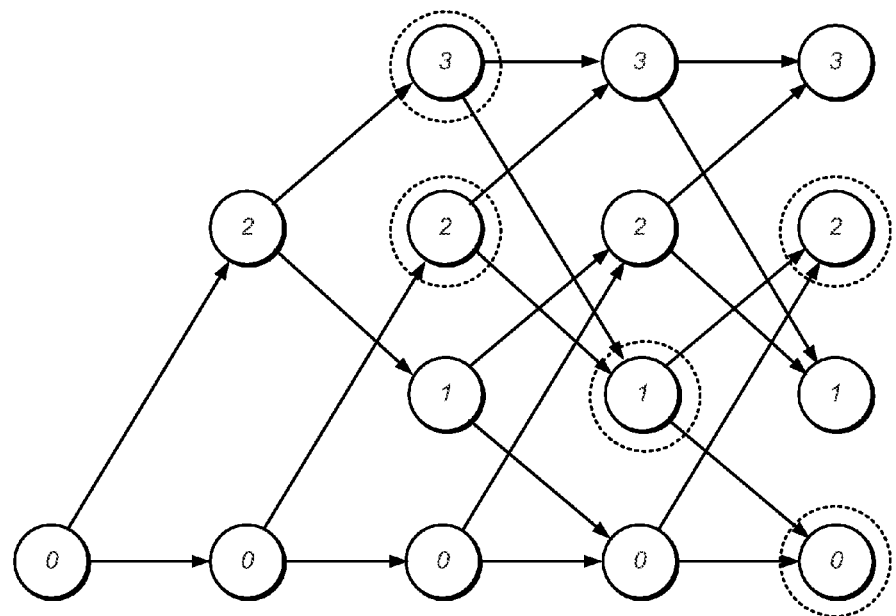
FIG. 9 illustrates one embodiment of a trellis, to be used to explain the presently disclosed Viterbi-DFE algorithm.
Figure 10:
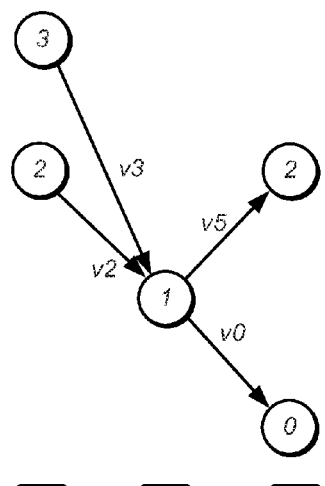
FIG. 10 shows an extracted portion of the trellis of FIG. 9.
Figure 11:
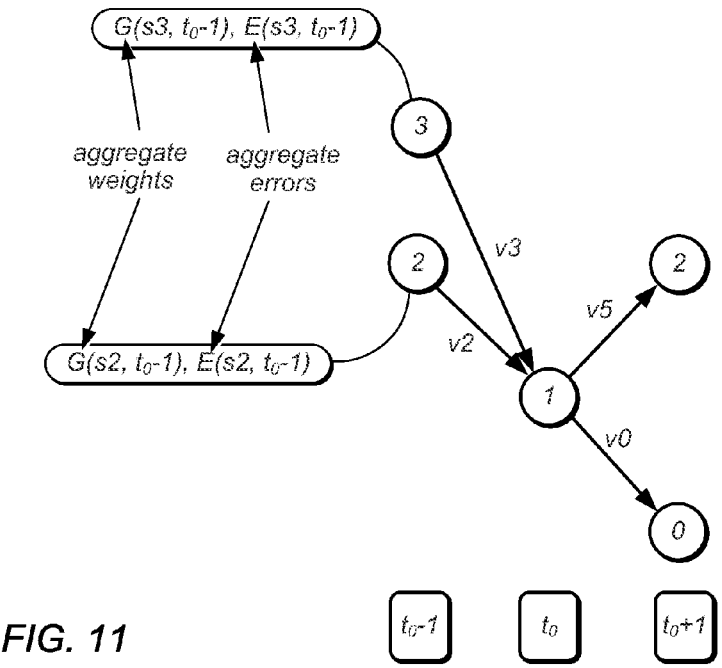
FIG. 11 shows the information held by the states s2 and s3 at time step $t_0-1$, according to one embodiment.

Consider the trellis of FIG. 9. We will describe the fundamental trellis computations in terms of the trellis portion highlighted with large circles. That portion is shown separately in FIG. 10, wherein, for the sake of illustration, we have enumerated the edges (also referred to as vertices or branches) as well as the states. Assume that at time $t_0$ the channel output is $y(t_0)$. The information held in the trellis at time $t_0-1$ is illustrated in FIG. 11: state s2 holds an aggregate error $E(s2, t_0-1)$ and an aggregate weight $G(s2,t_0-1)$, and state s3 holds an aggregate error $E(s3, t_0-1)$ and an aggregate weight $G(s3,t_0-1)$. More generally, each state s at time t holds an aggregate error E(s,t) and an aggregate weight G(s,t).

Figure 12:
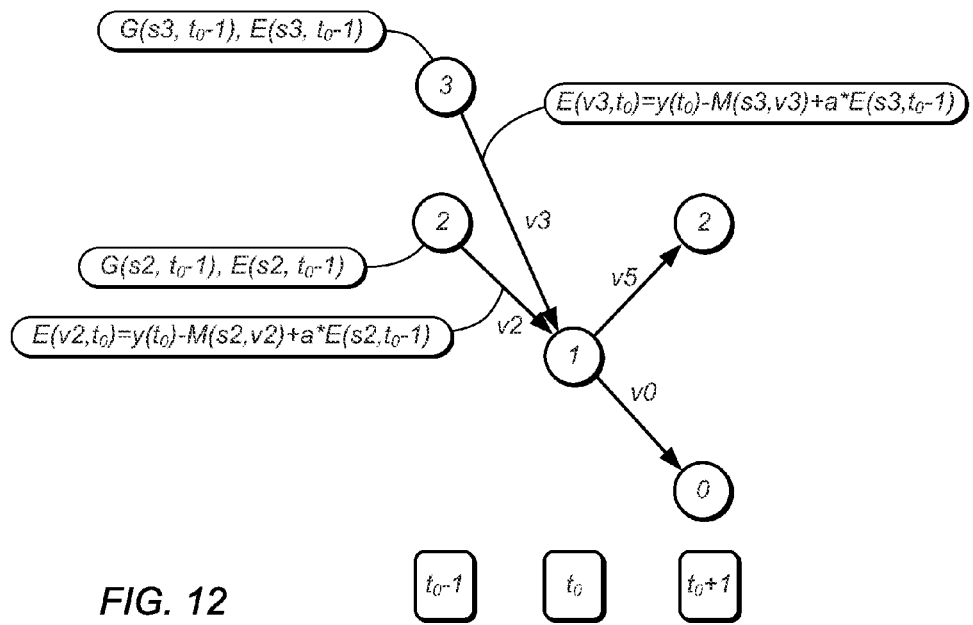
FIG. 12 depicts the computation of aggregate errors for vertices v2 and v3, according to one embodiment.

The computation of vertex error values $E(v2,t_0)$ and $E(v3,t_0)$ (also referred to as branch error values or edge error values) for respective vertices v2 and v3 is shown in FIG. 12. In particular, the vertex error values are computed according to the expressions:

$$E(v2,t_0)=y(t_0)-M(s2,v2)+a*E(s2,t_0-1)$$

$$E(v3,t_0)=y(t_0)-M(s3,v3)+a*E(s3,t_0-1),$$

wherein a is a non-zero real constant, where M(s,v) is the symbol (constellation point) associated with the vertex v starting from state s. Note that the last term (involving the aggregate error of the source state) in each of the above expressions has no analog in the standard Viterbi algorithm. Indeed, in the standard Viterbi algorithm, only the first two terms are present:

$$E(v2,t_0)=y(t_0)-M(s2,v2)$$

$$E(v3,t_0)=y(t_0)-M(s3,v3).$$

Figure 13:
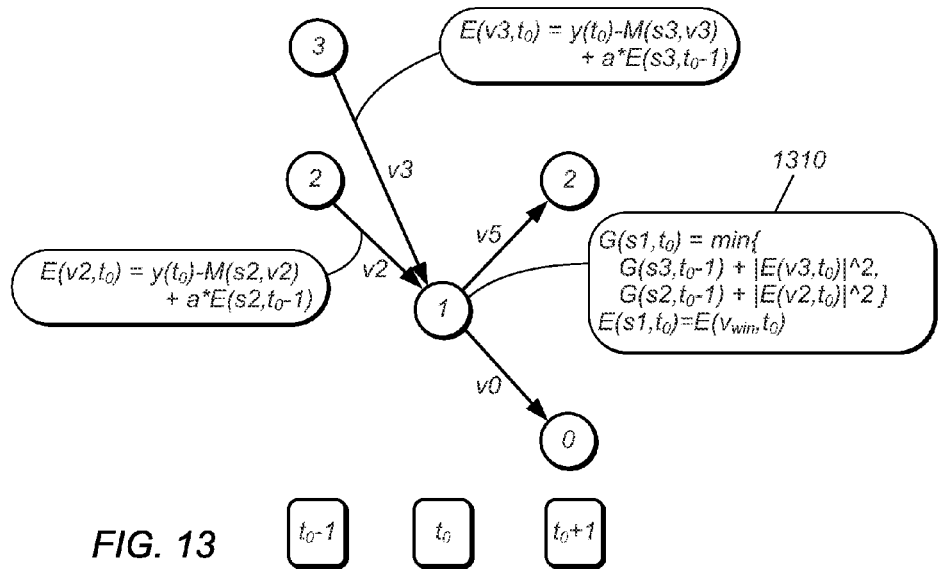
FIG. 13 illustrates one embodiment of the add-compare-select operation for the Viterbi-DFE algorithm.

The modified ACS step for the modified Viterbi algorithm is shown in callout box 1310 of FIG. 13. Note that the ACS step involves the determination of aggregate error $E(s1,t_0)$ in addition to the determination of aggregate weight $G(s1,t_0)$.

The aggregate weight $G(s1,t_0)$ for state s1 is set equal to the minimum of the candidate aggregate errors:

$$C_{v3}=G(s3,t_0-1)+|E(v3,t_0)|^2;$$

$$C_{v2}=G(s2,t_0-1)+|E(v2,t_0)|^2.$$

$$G(s1,t_0)=\min\{C_{v2},C_{v3}\}.$$

More generally, the candidate aggregate weight $C_v$ corresponding to vertex v is computed by adding the aggregate weight of the source state of the vertex v and a non-negative function of the vertex error $E(v,t_0)$. The non-negative function of the vertex error may be an increasing function of the absolute value of the vertex error. The non-negative function may depend on the stochastic nature of the noise. For Gaussian noise, the square of the absolute value may be used as the non-negative function. For phase domain noise, the absolute value may be used as the non-negative function, depending on the actual SNR. Let vertex $v_{win} \in \{v2,v3\}$ denote the vertex that achieves the above minimization. Let $s_{win}$ denote the source state of the vertex $v_{win}$. The winning path at state s1 is obtained by appending the vertex $v_{win}$ to the winning path of the source state $s_{win}$:

$$\text{path}(s1) \leftarrow \text{path}(s_{win}),v_{win}.$$

The aggregate error E(s1,t0) for state s1 is set equal to the error of the winning vertex $v_{win}$. In other words, $E(s1,t_0)$ is set equal to $$E(s1,t_0)=E(v_{win},t_0).$$

Figure 14:
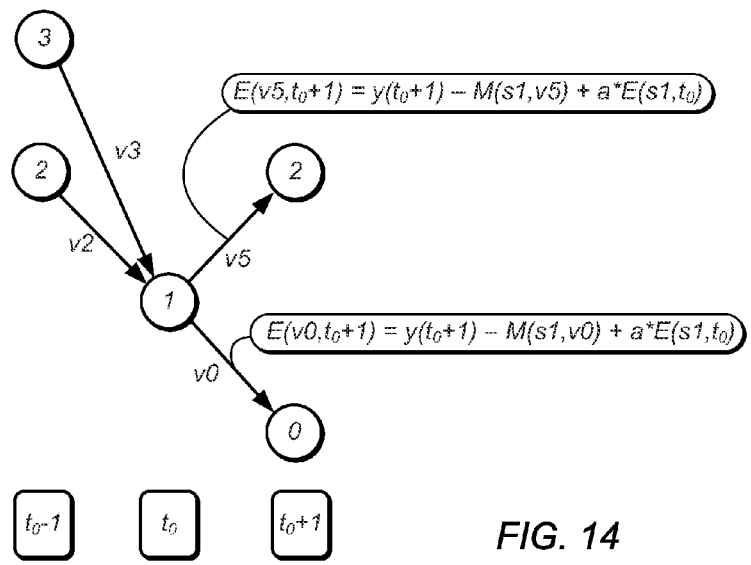
FIG. 14 illustrates the computation of aggregate errors for the vertices emerging from state s1, according to one embodiment.

Advancing now to the next time step (i.e., time step $t_0+1$), FIG. 14 illustrates the computation of vertex errors $E(v0, t_0+1)$ and $E(v5,t_0+1)$ for the vertices $v_0$ and $v_5$ starting from state s1. In particular, $$E(v0,t_0+1)=y(t_0+1)-M(s1,v0)+a*E(s1,t_0),$$

$$E(v5,t_0+1)=y(t_0+1)-M(s1,v5)+a*E(s1,t_0).$$

In some embodiments, the combined Viterbi-DFE algorithm may operate according to the following pseudo code:
Nstates←number of states in the original code trellis, i.e., number of states in the binary convolutional code (BCC);
Gamma←an [Nstates×1] vector. The s'th element of Gamma holds the aggregate weight of the s'th state;
e←an [Nstates×1] vector. The s'th element of e holds the aggregate error of the s'th state at the current value of time index t;
eprev←an [Nstates×1] vector. The s'th element of eprev holds the aggregate error of the s'th state at the previous time step;
u←an [Nstate×t] matrix of decoded bits, where t is the current value of time index t;
uprev←an [Nstate×t] matrix of decoded bits from the previous time step;
for t=1 to K
  for s=1 to Nstates
    p1←one state from which we arrive state s;
    p2←another state from which we arrive state s;
    w1=eprev(p1)*a+y(t)−M(p1); % error value of one edge entering s;
    w2=eprev(p2)*a+y(t)−M(p2); % error value of second edge entering s;
    Gamma(s)={GammaPrev(p1)+w1$^2$, GammaPrev(p2)+w2$^2$};
    % this is the ACS action;
    idx=1 or 2 depending on which edge produces the minimizing value Gamma(s), i.e., the edge that produces the winning path at s;
    b<idx>←the bit of the edge corresponding to the winning path;
    u(s,1:t)=[uprev(p_idx,1:t−1), b<idx>];
    e(s)=w<idx>; % each state save its noise estimation
  end for
  GammaPrev=Gamma;
  Uprev=u;
  eprev=e;
end for
Coded π/4-DQPSK in Phase Domain—Adjustments
Consider the following transmission. The mapper maps a pair (A[n],B[n]) of bits with a symbol from the constellation $$\{\pi/4, 3\pi/4, 5\pi/4, 7\pi/4\},$$

and the current symbol transmitted onto the physical channel has a phase that is the accumulation of the mapper-generated phases over time. The receiver extracts the phase and differentiates it. This yields a channel model which is effectively similar to the channel model described above in connection with FIG. 5A. A basic trellis component for this transmission, along with the expected symbol on each edge, is given in FIG. 15.

Some Adjustments for EDR2

Figure 15:
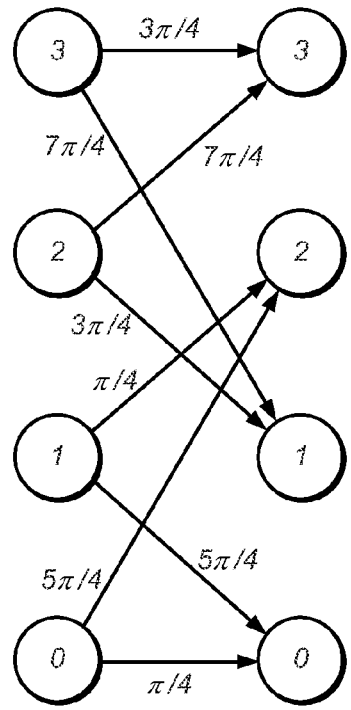
FIG. 15 illustrates one embodiment of a basic phase domain trellis component, for the case where the mapping at the transmitter is DQPSK.

When performing the above-described Viterbi-DFE computations on the trellis of FIG. 15, the computations may be performed in the phase domain, i.e., the received symbols y[t] are phase values. The non-negative function used to operate on the branch's error (when computing an aggregate weight candidate) is the absolute value of the branch's error, not the square of the branch's error. The error of the branch is the distance modulo [−π, π) between the channel realization and the constellation point. The aggregate error is computed as described above.

Figure 16:
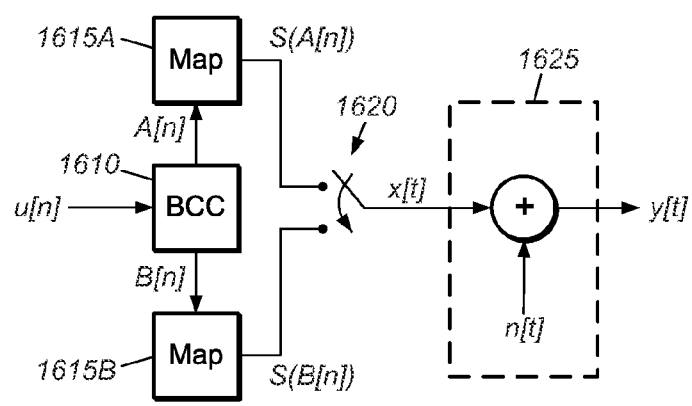
FIG. 16 illustrates a transmitter having a binary convolutional code with rate ½ and a pair of mappers, each of which maps bits to symbols using BPSK.

To implement the phase differentiation, the receiver may apply the operation $y_n y_n^*$ on the received symbol sequence $\{y_n\}$, where the superscript "*" denotes complex conjugation. Recall that complex conjugation negates the phase of a complex number.)
1.2 BPSK and Variants The difference between BPSK case and QPSK case is that now each data bit u(n) is translated into two channel uses. As shown in FIG. 16, the current output bits A(n) and B(n) of the binary convolutional code (BCC) 1610 are supplied respectively to mappers 1615A and 1615B. The mappers may be identically configured. For example, each mapper may be a BPSK mapper. The mapper 1615A generates a symbol S(A[n]) corresponding to the bit A[n], and the mapper 1615B generates a symbol S(B[n]) corresponding to the bit B[n]. The symbols S(A[n]) and S(B[n]) are transmitted sequentially onto the channel 1625. (In the following discussion, we may refer to the symbols S(A[n]) and S(B[n]) more compactly as A[n] and B[n]. While this is a slight abuse of notation, it will simplify the mathematical expressions to be presented below. It will be clear from context whether we are referring to A[n] and B[n] as bits or as symbols.) More generally, the symbols generated over time by the mapper 1615A and the symbols generated over time by the mapper 1615B may be transmitted onto the channel 1625 in an alternating fashion, as suggested by multiplexer 1620. For example, the symbols from mapper 1615A may be transmitted in even-numbered time slots, and the symbols from mapper 1615B may be transmitted in odd-numbered time slots. Channel 1625 may be a colored noise channel as described above in connection with FIG. 5A.

Figure 17:
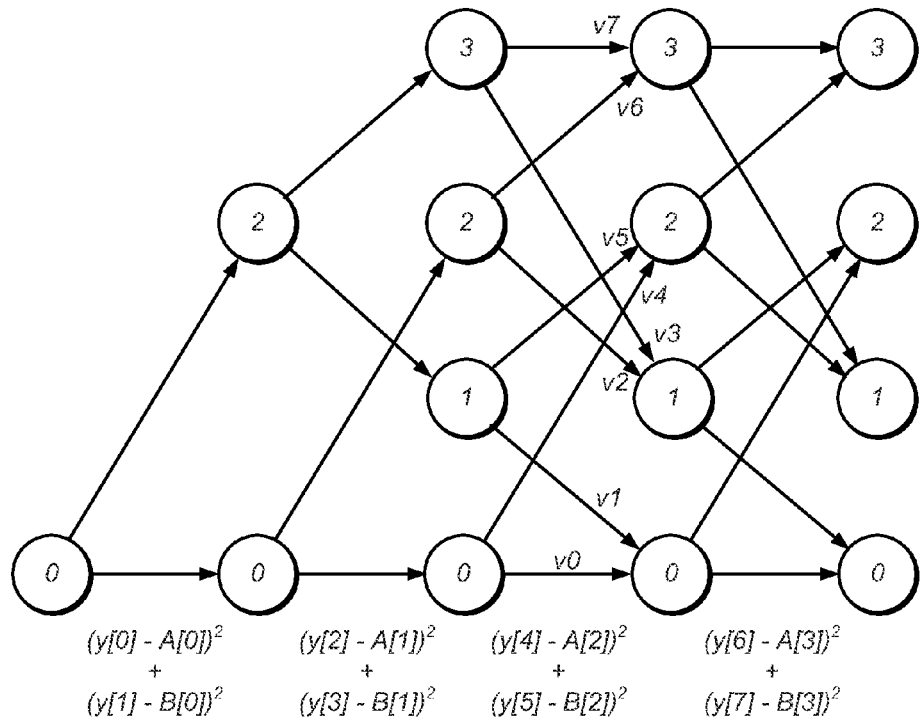
FIG. 17 illustrates one embodiment of a symbol domain trellis that may be used to decode the transmissions from the transmitter of FIG. 16.

FIG. 17 illustrates a symbol domain trellis for the transmitter of FIG. 16. Note that we now have two errors for each vertex—one error for each of the two channel uses corresponding to the vertex. According to the standard Viterbi algorithm, the two errors for a branch b at time n are $$y[2n]-A[b],$$

$$y[2n+1]-B[b],$$

where A[b] and B[b] are the two symbols associated with the branch. The metric (i.e., weight) for the vertex is a sum of squares of the errors:

$$(y[2n]-A[b])^2+(y[2n+1]-B[b])^2.$$

Figure 18:
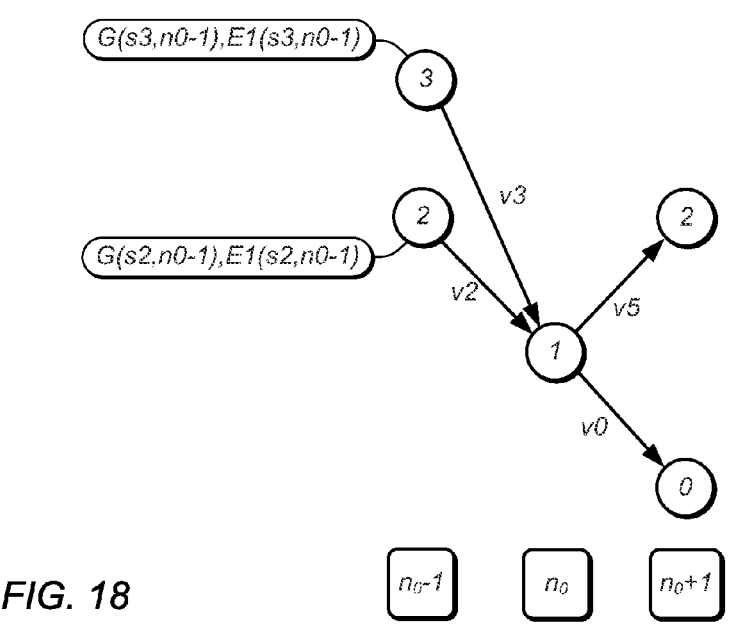
FIG. 18 illustrates the information held by each of the previous states s2 and s3, according to one embodiment.
Figure 19:
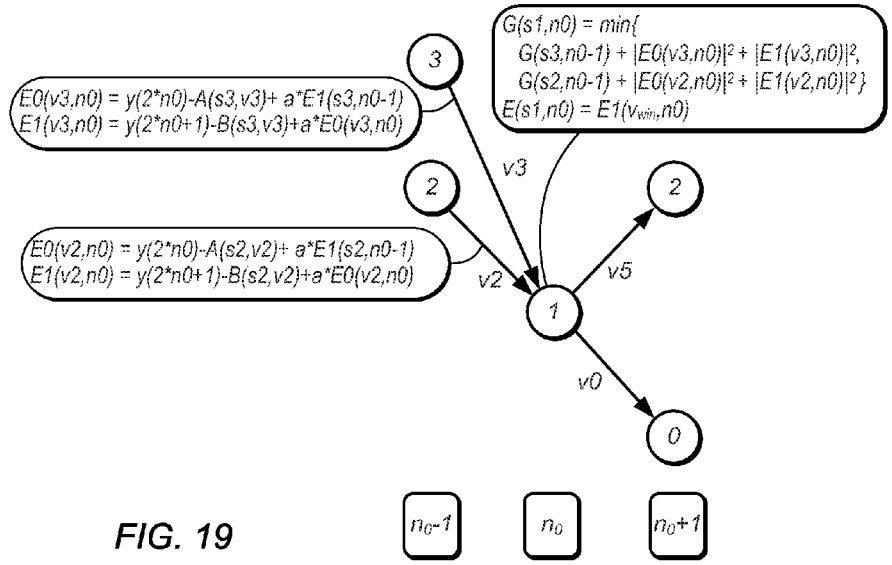
FIG. 19 illustrates computation of errors on each of the vertices v2 and v3, and the add-compare-selection operation, according to one embodiment.
Figure 20:
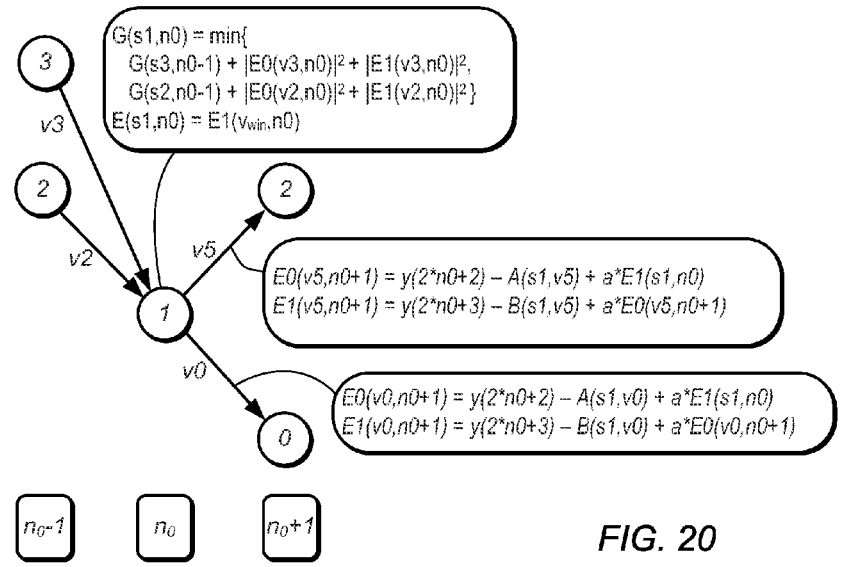
FIG. 20 illustrates the computation of errors on vertices v0 and v5 emerging from state s1.

The evolution of the combined Viterbi-DFE algorithm is explained in terms of a specific portion of the trellis, as shown in FIGS. 18-20. FIG. 18 shows the values held by states s2 and s3 at time $n_0-1$. State s2 holds an aggregate weight value $G(s2,n_0-1)$ and an aggregate error value $E1(s2, n_0-1)$, and state s3 holds an aggregate weight value $G(s3, n_0-1)$ and an aggregate error value $E1(s3,n_0-1)$.

FIG. 19 shows the computation of vertex error values for vertices v2 and v3, and the generalized add-compare-select (ACS) operation for state s1 at time n0.

For vertex v2, a first aggregate error value E0(v2,n0) and a second aggregate error value E1(v2,n0) are computed based on the expressions:

$$E0(v2,n0)=y(2n_0)-A(s2,v2)+a*E1(s2,n0-1)$$

$$E1(v2,n0)=y(2n_0+1)-B(s2,v2)+a*E0(v2,n0).$$

Note that the first aggregate error value contributes to the second aggregate error value.

For the vertex v3, a first aggregate error value E0(v3,n0) and a second aggregate error value E1(v3,n0) are computed based on the expressions:

$$E0(v3,n0)=y(2n_0)-A(s3,v3)+a*E1(s3,n0-1)$$

$$E1(v3,n0)=y(2n_0+1)-B(s3,v3)+a*E0(v3,n0).$$

For the state s1, two candidate aggregate weights are computed, i.e, one candidate for each of the vertices terminating at s1:

$$C_{v2}=G(s2,n0-1)+|E0(v2,n0)|^2+|E1(v^2n0)|^2$$

$$C_{v3}=G(s3,n0-1)+|E0(v3,n0)|^2+|E1(v3,n0)|^2.$$

The minimum of the two candidate aggregate weights is selected as the aggregate weight for the state s1:

$$G(s1,t0)=\min\{C_{v2},C_{v3}\}.$$

Let $v_{win} \in \{v2,v3\}$ denote the vertex that achieves the above minimum, and let s denote the source state of the vertex $v_{win}$.

The aggregate error E1(s1,t0) of the state s1 at time n0 is defined as $$E1(s1,n0)=E1(v_{win},n0),$$

The winning path terminating at state s1 is defined as the winning path terminating at state $s_{win}$ concatenated (at its end) with the vertex $v_{win}$.

FIG. 20 illustrates the progress of error to the next time step. Two vertices emerge from state s1, i.e., vertices v0 and v5. For vertex, a first aggregate error value E0(v0,n0+1) and a second aggregate error value E1(v0,n0+1) are computed according to the relations:

$$E0(v0,n0+1)=y(2*n0+2)-A(s1,v0)+a*E1(s1,n0)$$

$$E1(v0,n0+1)=y(2*n0+3)-B(s1,v0)+a*E0(v0,n0+1).$$

For the vertex v5, a first aggregate error value E0(v5,n0+1) and a second aggregate error value E1(v5,n0+1) are computed according to the relations:

$$E0(v5,n0+1)=y(2*n0+2)-A(s1,v5)+a*E1(s1,n0)$$

$$E1(v5,n0+1)=y(2*n0+3)-B(s1,v5)+a*E0(v5,n0+1).$$

In some embodiments, the combined Viterbi-DFE algorithm may be performed based on the following pseudo code.

Pseudo Code: Viterbi-DFE with Two Case Uses Per Original Information Bit
Nstates←number of states in the original code trellis;
Gamma←an [Nstates×1] vector, wherein the s'th element holds the aggregated weight of the s'th state at the current time step;
GammaPrev←an [Nstates×1] vector, wherein the s'th element holds the aggregated weight of the s'th state at the previous time step;
e1←an [Nstates×1] vector, wherein the s'th element holds the aggregated error of the s'th state at the current time step;
e1prev←an [Nstates×1] vector, wherein the s'th element holds the aggregated error of the s'th state at the previous time step;
u←an [Nstates×t] matrix of decoded bits, where t is the current value of the time index;
uprev←an [Nstates×t] matrix of decoded bits from the previous time step;
for t=1 to K
  for s=1 to Nstates
    p1←one state from which we arrive state s;
    p2←another state from which we arrive state s;
    v1←the branch connecting p1 to s;
    v2←the branch connecting p2 to s;
    e0_1=a*e1(p1)+y(2*t)−A(v1);
    e1_1=a*e0_1+y(2*t+1)−B(v1);
    e0_2=a*e1(p2)+y(2*t)−A(v2);
    e1_2=a*e0_2+y(2*t+1)−B(v2);
    Candidate1=GammaPrev(p1)+(e0_1)²+(e1_1)²;
    Candidate2=GammaPrev(p2)+(e0_2)²+(e1_2)²;
    Gamma(s)=min{Candidate1, Candidate2}; % ACS action
    idx=1 or 2 depending on which edge produces the minimum value Gamma(s);
    b<idx>←the bit of the branch corresponding to the winning path.
    u(s,1:t)=[uprev(p_idx,1:t−1), b<idx>]; % append the new bit
    e1(s)=e1_<idx>; % for each state, save its noise estimation
  end for
  GammaPrev=Gamma;
  eprev=e;
  uprev=u;
end for 2.0 Noise Properties In this section, we consider some of the properties of the noise along the decision path.

2.1 Noise Dependence on Time

In an error-free world (i.e., x[t]=x̂ and n[t]=e[t]), the noise at the slicer's input (assuming error free slicing) is given by:

$$z[t] = n[t] + \alpha n[t-1]$$

$$= \sum_{i=1}^{t} \alpha^{t-i} z[i]$$

$$= \sum_{i=1}^{t} \alpha^{t-i} (w[i] - w[i-1])$$

$$= \sum_{i=1}^{t} \alpha^{t-i} w[i] - \sum_{i=1}^{t} \alpha^{t-i} w[i-1]$$

$$= \sum_{i=1}^{t} \alpha^{t-i} w[i] - \sum_{i=1}^{t} \alpha^{t-i} w[i-1]$$

$$= \sum_{i=1}^{t} \alpha^{t-i} w[i] - \sum_{m=0}^{t-1} \alpha^{t-1-m} w[m]$$

$$= \sum_{i=1}^{t} \alpha^{t-i} w[i] - \alpha^{-1} \sum_{i=1}^{t-1} \alpha^{t-i} w[i]$$

$$= \sum_{i=1}^{t} \alpha^{t-i} w[i] - \alpha^{-1} \left( \alpha^{t} w[0] + \sum_{i=1}^{t-1} \alpha^{t-i} w[i] \right)$$

$$= w[t] + (1 - \alpha^{-1}) \sum_{i=1}^{t-1} \alpha^{t-i} w[i] - \alpha^{t-1} w[0]$$

In case the input noise w[t] is Gaussian, n[t] is obviously Gaussian as well. Its mean is zero, and the variance is given by (for α<1):

$$\mathrm{var}[z[t]] = \sigma^2\left(1 + \frac{(1-\alpha)^2}{1-\alpha^2}(1-\alpha^{2(t-1)}) + \alpha^{2(t-1)}\right),$$

wherein σ represents the standard deviation of the AWGN (w[t]). This implies a trade off between convergence time and steady state variance value, as illustrated in FIG. 6B. Note that for α=1, the variance remains 2 (or 3 dB) for the entire transmission (for α=1, n(t)=w(t)+w(0) for all t).

Stationarity

Stationarity is a well-known phenomenon. When a stationary (in particular, i.i.d) process passes through a linear time invariant (LTI) system, the output is only asymptotically stationary. Since the optimal value of the noise is 0 dB, the asymptotic value of the noise at each decision of the DFE represents its distance from optimality.

Variation of the Parameter a

In some embodiments, the parameter a may be varied as a function of time. For example, in one embodiment, the parameter a varies with respect to time step k according to the expression $$a_k = c \cdot \sqrt{\frac{\sum_{m=1}^{k-1} c^{2m}}{\sum_{m=1}^{k} c^{2m}}}.$$

This choice of $a_k$ is optimal for any value of c, assuming Gaussian noise. The other values we employ for a may be interpreted as approximations, made in order to simplify the scheme.

Recall that c is the scalar multiplication parameter in the one-tap colored noise model $$n[t]=w[t]-c*w[t-1].$$

Performance for 4-PAM

Figure 21:
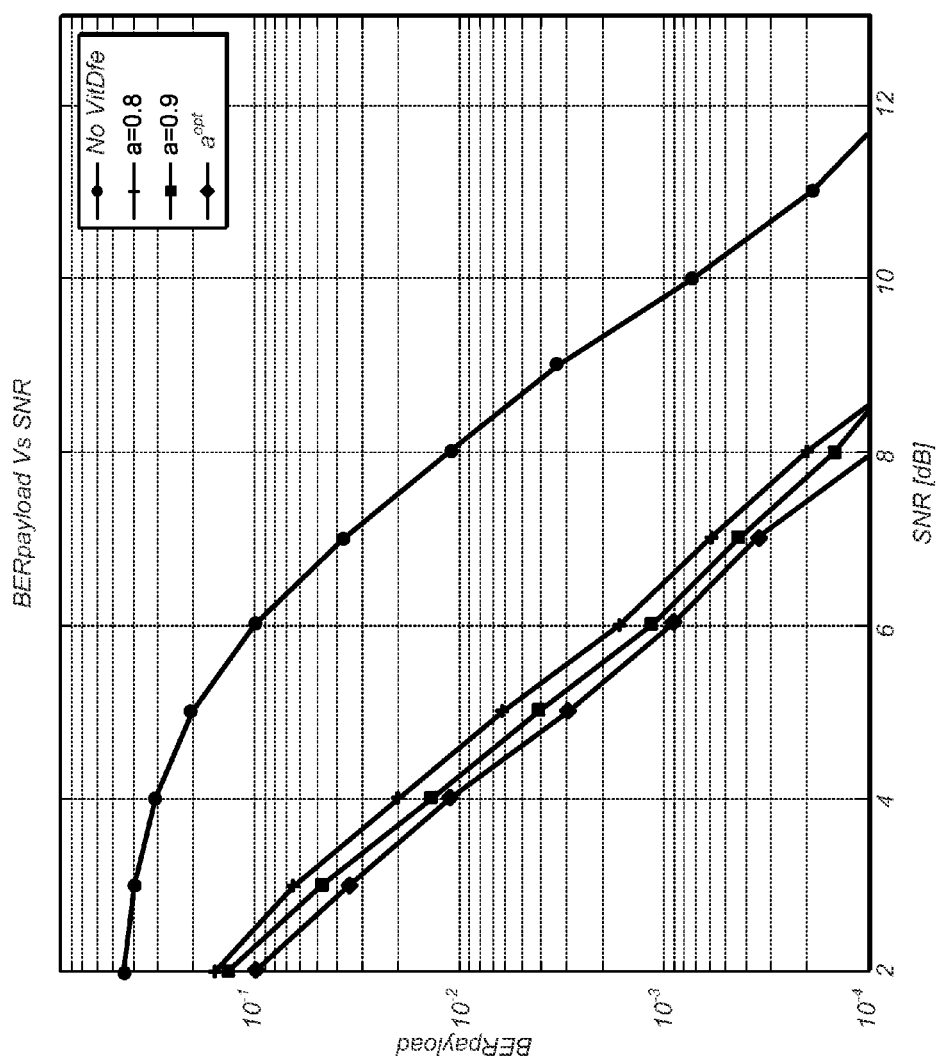
FIG. 21 presents Bit Error Rate (BER) vs. SNR for 4-PAM, according to one embodiment.
Figure 22:
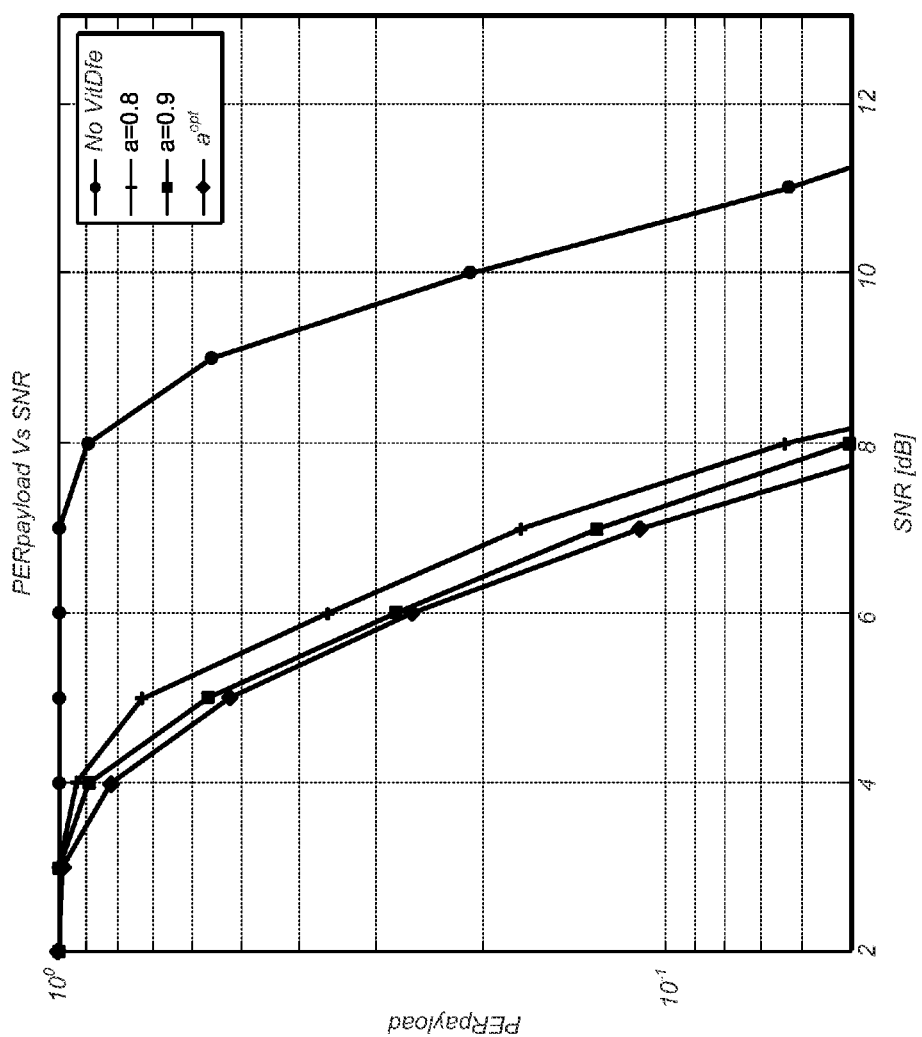
FIG. 22 presents Packet Error Rate (PER) vs. SNR for 4-PAM, according to one embodiment.

FIGS. 21 and 22 show performance results for the 4-PAM case. The convolutional encoder employed is a standard convolutional encoder with rate R=½, and with octal polynomials [133,171]. The statistical computations underlying FIGS. 21 and 22 involve 1000 packets per point, and 500 data bits per packet. FIG. 21 shows bit error rate (BER) of the payload bits as a function of signal-to-noise ratio (SNR) for 4-PAM. FIG. 22 shows PER as a function of signal-to-noise ratio for 4-PAM. Each of the FIGS. 21 and 22 shows curves for a=0.8, 0.9 and $a^{opt}$, where $a^{opt}$ represents the expression for $a_k$ given above. Each Figure also shows a curve for "no Viterbi-DFE", meaning that bits were detected employing standard Viterbi Algorithm.

We disclose (among other things) a modification of the Viterbi Algorithm (VA) for the case where the additive noise is colored by a 1st order FIR filter. The modified algorithm may be easily implemented in a digital signal processor (DSP) and/or in dedicated hardware. The modified algorithm exhibits substantial improvement in performance when compared to the original VA (which ignores the non-white nature of the noise), even when the number of states in the trellis is identical to the number used in the original VA. Furthermore, the modified algorithm keeps the complexity of decoding quite low (on the scale of the ordinary VA). More specifically, it can be shown that the modified algorithm provides a ~3.5 dB improvement when comparing, e.g., the SNR necessary for a bit error rate (BER) of 0.001.

Figure 23:
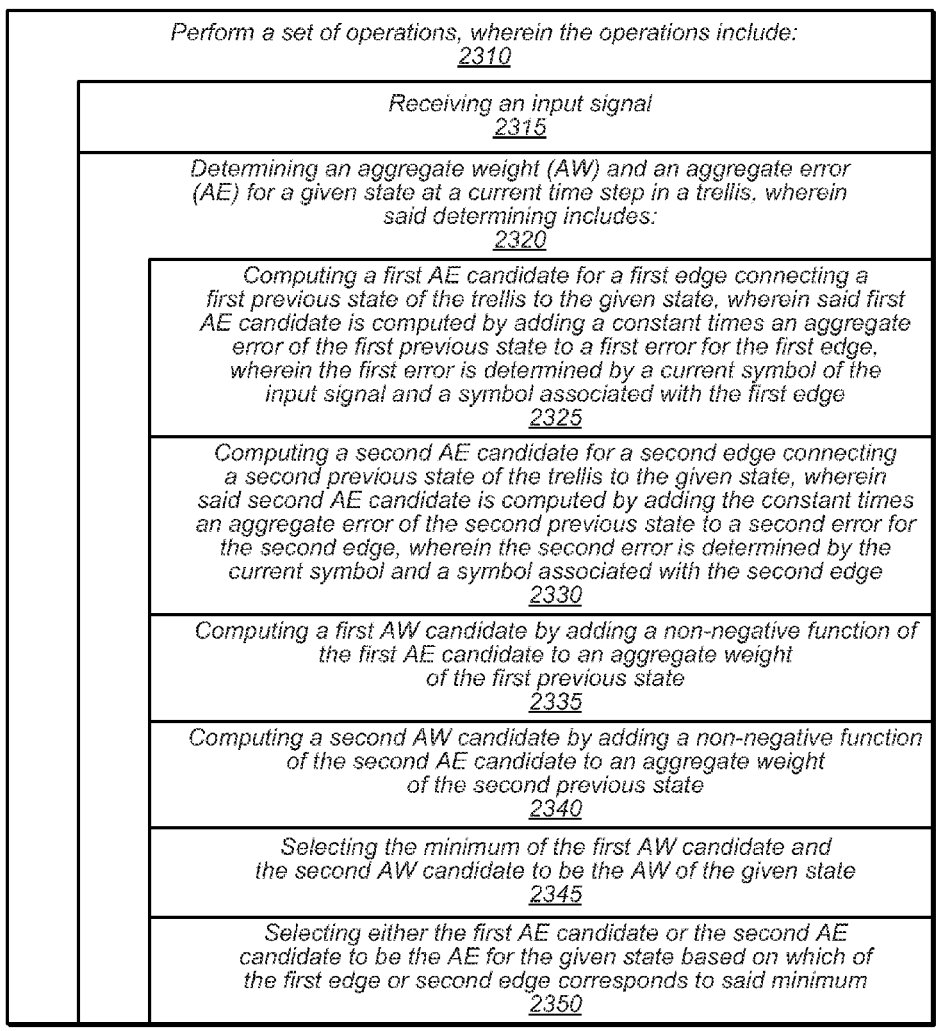
FIG. 23 illustrates one embodiment of a method for performing joint Viterbi-DFE decoding, under the assumption of a binary convolutional code with rate ½ and a mapping with two bits per channel symbol.

In one set of embodiments, a method 2300 for operating a receiver may be performed as shown in FIG. 23. (The method 2300 may also include any subset of the features, elements and embodiments described above.) The method 2300 may include an algorithm for jointly performing Viterbi decoding and decision feedback equalization. The method 2300 may be performed by digital circuitry of the receiver. The digital circuitry may be implemented by one or more processors executing stored program instructions, by dedicated digital circuitry such as one or more ASICs, by programmable hardware such as one or more FPGAs, or by any combination of the foregoing.

At 2310, the digital circuitry may perform a set of operations. The set of operations may include the operations 2315 and 2320 as follows.

At 2315, the digital circuitry may receive an input signal. The receiver may include front end circuitry that receives an RF signal from a wireless transmission medium, and down-converts the RF signal to obtain an analog baseband signal. The analog baseband signal may be sampled by an analog-to-digital converter to obtain a sampled signal, which serves as the input signal to the digital circuitry.

At 2320, the digital circuitry may determine an aggregate weight (AW) and an aggregate error (AE) for a given state at a current time step in a trellis. The AW and AE may be used to recover information from the input signal, wherein the trellis is defined by a binary convolutional code of rate ½ and a 4-point mapping. The action 2320 of determining the AW and AE for the given state may include operations 2325 through 2350 as described below.

At 2325, the digital circuitry may compute a first AE candidate for a first edge connecting a first previous state of the trellis to the given state, wherein said first AE candidate is computed by adding a constant times an aggregate error of the first previous state to a first error for the first edge, wherein the first error is determined by a current symbol of the input signal and a symbol associated with the first edge.

At 2330, the digital circuitry may compute a second AE candidate for a second edge connecting a second previous state of the trellis to the given state, wherein said second AE candidate is computed by adding the constant times an aggregate error of the second previous state to a second error for the second edge, wherein the second error is determined by the current symbol and a symbol associated with the second edge.

At 2335, the digital circuitry may compute a first AW candidate by adding a non-negative function of the first AE candidate to an aggregate weight of the first previous state. The non-negative function of the first AE candidate may be an increasing function of the absolute value of the first AE candidate. (If the first AE candidate is a complex number, the term "absolute value" is interpreted as the modulus or length of the complex number.)

At 2340, the digital circuitry may compute a second AW candidate by adding a non-negative function of the second AE candidate to an aggregate weight of the second previous state. The non-negative function of the second AE candidate may be an increasing function of the absolute value of the second AE candidate.

At 2345, the digital circuitry may select the minimum of the first AW candidate and the second AW candidate to be the AW of the given state.

At 2350, the digital circuitry may select either the first AE candidate or the second AE candidate to be the AE for the given state based on which of the first edge or second edge corresponds to said minimum.

In some embodiments, the operations may also include generating a decoded bit vector for the given state by: (a) selecting either a decoded bit vector of the first previous state or a decoded bit vector of the second previous state based on which of the first edge or second edge corresponds to said minimum; (b) selecting either a first original information bit associated with corresponding to the first edge or a second original information bit associated with corresponding to the second edge as a winner bit based on which of the first edge or second edge corresponds to said minimum; and (c) appending the winner bit to the selected decoded bit vector.

In some embodiments, the operations include performing said determining and said generating for each state at the current time step in the trellis.

In the case where the current time step is the last time step of the trellis, the operations may include: (1) selecting a state at the last time step of the trellis that gives a minimum value of aggregate weight; and (2) outputting the decoded bit vector of the selected state as an estimate for an original bit sequence transmitted by a transmitter.

After having performed said determining and said generating for each state at the current time step, the digital circuitry may perform said determining and said generating for each state at the next time step in the trellis.

In some embodiments, the 4-point mapping is a 4-PAM mapping.

In some embodiments, the 4-point mapping is a differential quadrature phase shift keying (DQPSK) mapping.

In some embodiments, the weight of the first AE candidate is a square of an absolute value of the first AE candidate, and, the weight of the second AE candidate is a square of an absolute value of the second AE candidate.

In some embodiments, the weight of the first AE candidate is an absolute value of the first AE candidate, and, the weight of the second AE candidate is an absolute value of the second AE candidate.

In one set of embodiments, a receiver for jointly performing Viterbi decoding and decision feedback equalization may include front end circuitry and digital circuitry. (The receiver may also include any subset of the features, elements and embodiments described above.) In one embodiment, the receiver is a wireless receiver, in which case, the receiver may include one or more antennas for capturing signals from a wireless transmission medium such as free space or the atmosphere. In another embodiment, the receiver is a wired receiver, in which case, the receiver may include an interface for receiving signals from a wired transmission medium such as an electrically conductive cable or a fiber optic cable.

The front end circuitry may be configured to receive an RF signal from a transmission medium, and convert the RF signal to a sampled signal.

The digital circuitry may be configured to perform operations, wherein the operations include determining an aggregate weight (AW) and an aggregate error (AE) for a given state at a current time step in a trellis, wherein the AW and AE are used to recover information from the sampled signal, wherein the trellis is defined by a binary convolutional code of rate ½ and a 4-point mapping.

The action of determining AW and AE for the given state may include: (a) computing a first AE candidate for a first edge connecting a first previous state of the trellis to the given state, wherein said first AE candidate is computed by adding a constant times an aggregate error of the first previous state to a first error for the first edge; (b) computing a second AE candidate for a second edge connecting a second previous state of the trellis to the given state, wherein said second AE candidate is computed by adding the constant times an aggregate error of the second previous state to a second error for the second edge; (c) computing a first AW candidate by adding a non-negative function of the first AE candidate to an aggregate weight of the first previous state; (d) computing a second AW candidate by adding a non-negative function of the second AE candidate to an aggregate weight of the second previous state; (e) selecting the minimum of the first AW candidate and the second AW candidate to be the AW of the given state.

Figure 24:
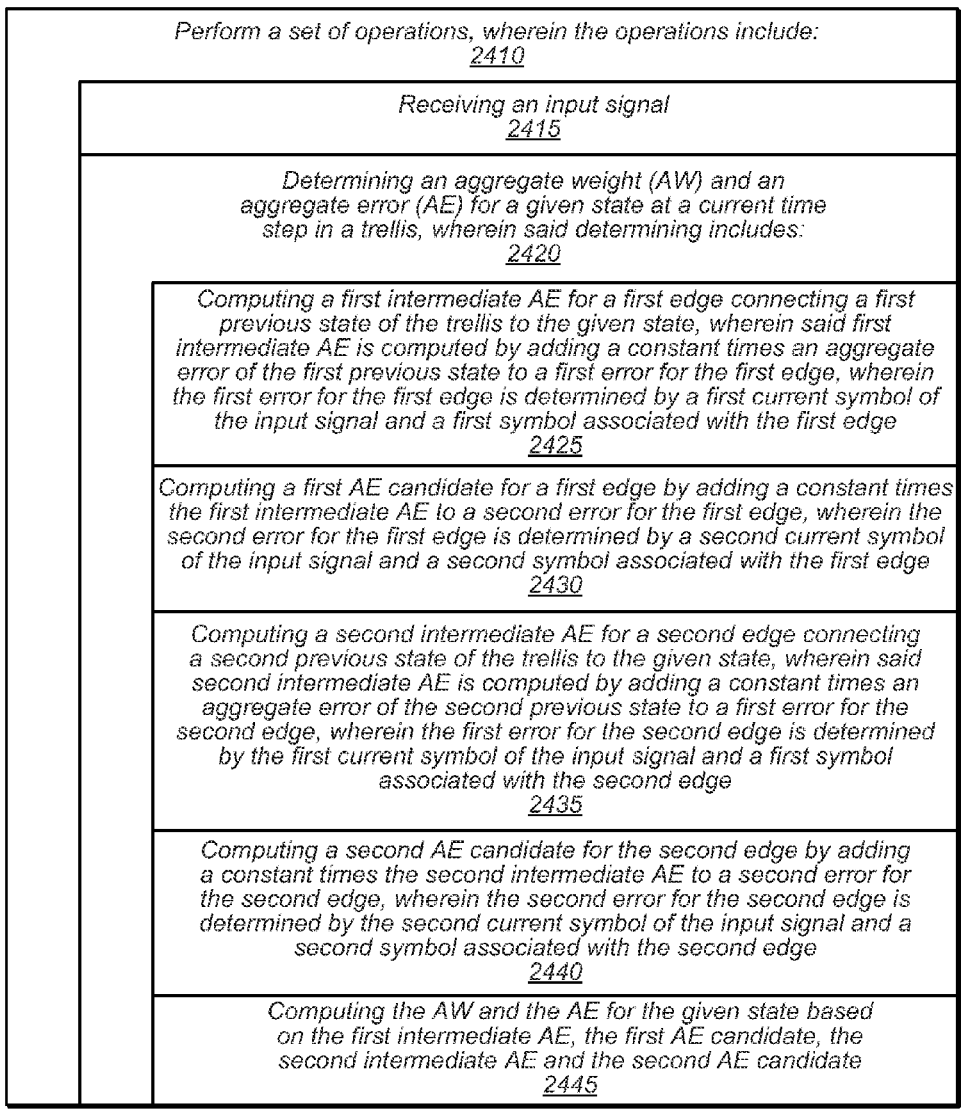
FIG. 24 illustrates one embodiment of a method for performing joint Viterbi-DFE decoding, under the assumption of a binary convolutional code with rate ½ and two mappers that each use one bit per channel symbol.

In one set of embodiments, a method 2400 for operating a receiver may be performed as shown in FIG. 24. (The method 2400 may also include any subset of the features, elements and embodiments described above.) The method 2400 may include an algorithm for jointly performing Viterbi decoding and decision feedback equalization. The method 2400 may be performed by digital circuitry of the receiver. The digital circuitry may be implemented by one or more processors executing stored program instructions, by dedicated digital circuitry such as one or more ASICs, by programmable hardware such as one or more FPGAs, or by any combination of the foregoing.

At 2410, the digital circuitry may perform a set of operations, where the set of operations includes operations 2415 and 2420 as follows.

At 2415, the digital circuitry may receive an input signal, e.g., as variously described above.

At 2420, the digital circuitry may determine an aggregate weight (AW) and an aggregate error (AE) for a given state at a current time step in a trellis. The AW and the AE may be used to recover information from the input signal. The trellis is defined by a binary convolutional code of rate ½ and a BPSK mapping, e.g., as variously described above. See, e.g., FIG. 16 and the corresponding discussion. The action of determining the AW and the AW for the given state may include operations 2425 through 2445 as described below.

At 2425, the digital circuitry may compute a first intermediate AE for a first edge connecting a first previous state of the trellis to the given state, wherein said first intermediate AE is computed by adding a constant times an aggregate error of the first previous state to a first error for the first edge, wherein the first error for the first edge is determined by a first current symbol of the input signal and a first symbol associated with the first edge.

At 2430, the digital circuitry may compute a first AE candidate for a first edge by adding a constant times the first intermediate AE to a second error for the first edge, wherein the second error for the first edge is determined by a second current symbol of the input signal and a second symbol associated with the first edge.

At 2435, the digital circuitry may compute a second intermediate AE for a second edge connecting a second previous state of the trellis to the given state, wherein said second intermediate AE is computed by adding a constant times an aggregate error of the second previous state to a first error for the second edge, wherein the first error for the second edge is determined by the first current symbol of the input signal and a first symbol associated with the second edge.

At 2440, the digital circuitry may compute a second AE candidate for the second edge by adding a constant times the second intermediate AE to a second error for the second edge, wherein the second error for the second edge is determined by the second current symbol of the input signal and a second symbol associated with the second edge.

At 2445, the digital circuitry may compute compute the AW and the AE for the given state based on the first intermediate AE, the first AE candidate, the second intermediate AE and the second AE candidate.

In some embodiments, the action of computing the AW and the AE for the given state includes: (a) computing a first AW candidate by adding a non-negative function of the first intermediate AE and a non-negative function of the first AE candidate to an aggregate weight of the first previous state; (b) computing a second AW candidate by adding a non-negative function of the second intermediate AE and a non-negative function of the second AE candidate to an aggregate weight of the second previous state; (c) selecting the minimum of the first AW candidate and the second AW candidate to be the AW of the given state; and (d) selecting either the first AE candidate or the second AE candidate to be the AE for the given state based on which of the first edge or second edge corresponds to said minimum.

In some embodiments, the set of operations also includes generating a decoded bit vector for the given state by: (1) selecting either a decoded bit vector of the first previous state or a decoded bit vector of the second previous state based on which of the first edge or second edge corresponds to said minimum; (2) selecting either a first original information bit corresponding to the first edge or a second original information bit corresponding to the second edge as a winner bit based on which of the first edge or second edge corresponds to said minimum; and (3) appending the winner bit to the selected decoded bit vector.

In some embodiments, the operations include performing said determining and said generating for each state at the current time step in the trellis.

In the case where the current time step is the last time step of the trellis, the operations may also include: selecting a state at the last time step of the trellis that give a minimum value of aggregate weight; and outputting the decoded bit vector of the selected state as an estimate for an original bit sequence transmitted by a transmitter.

After having performed said determining and said generating for each state at the current time step, the digital circuitry may perform said determining and said generating for each state at the next time step in the trellis.

In one set of embodiments, a receiver for jointly performing Viterbi decoding and decision feedback equalization may include front end circuitry and digital circuitry as described below. (The receiver may also include any subset of the features, elements and embodiments described above.) In one embodiment, the receiver is a wireless receiver, in which case, the receiver may include one or more antennas for capturing signals from a wireless transmission medium such as free space or the atmosphere. In another embodiment, the receiver is a wired receiver, in which case, the receiver may include an interface for receiving signals from a wired transmission medium such as an electrically conductive cable or a fiber optic cable.

The front end circuitry may be configured to receive an RF signal from a transmission medium, and convert the RF signal to a sampled signal.

The digital circuitry may be configured to determine an aggregate weight (AW) and an aggregate error (AE) for a given state at a current time step in a trellis, wherein the AW and the AE are used to recover information from the input signal, wherein the trellis is defined by a binary convolutional code of rate ½ and a BPSK mapping.

The action of determining the AW and AE for the given state may include: (a) computing a first intermediate AE for a first edge connecting a first previous state of the trellis to the given state, wherein said first intermediate AE is computed by adding a constant times an aggregate error of the first previous state to a first error for the first edge; (b) computing a first AE candidate for a first edge by adding a constant times the first intermediate AE to a second error for the first edge; (c) computing a second intermediate AE for a second edge connecting a second previous state of the trellis to the given state, wherein said second intermediate AE is computed by adding a constant times an aggregate error of the second previous state to a first error for the second edge; (d) computing a second AE candidate for the second edge by adding a constant times the second intermediate AE to a second error for the second edge; and (e) computing the AW and the AE for the given state based on the first intermediate AE, the first AE candidate, the second intermediate AE and the second AE candidate.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms, e.g., as variously described above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A receiver for jointly performing Viterbi decoding and decision feedback equalization, the receiver comprising:
    front end circuitry configured to receive an RF signal from a transmission medium, and convert the RF signal to a sampled signal, wherein the RF signal carries an original bit sequence in encoded form;
    digital circuitry configured to perform operations, wherein the operations include determining an aggregate weight (AW) and an aggregate error (AE) for a given state at a current time step in a trellis, wherein the AW and AE are used to recover information from the sampled signal, wherein the trellis is defined by a binary convolutional code of rate ½ and a 4-point mapping, wherein said determining includes:
  computing a first AE candidate for a first edge connecting a first previous state of the trellis to the given state, wherein said first AE candidate is computed by adding a constant times an aggregate error of the first previous state to a first error for the first edge;
  computing a second AE candidate for a second edge connecting a second previous state of the trellis to the given state, wherein said second AE candidate is computed by adding the constant times an aggregate error of the second previous state to a second error for the second edge;
  computing a first AW candidate by adding a non-negative function of the first AE candidate to an aggregate weight of the first previous state;
  computing a second AW candidate by adding a non-negative function of the second AE candidate to an aggregate weight of the second previous state; and
  selecting a minimum of the first AW candidate and the second AW candidate to be the AW of the given state, wherein the AW of the given state is used to obtain an estimate of the original bit sequence;
wherein the operations also include outputting the estimated of the original bit sequence.

2. The receiver of claim 1, wherein the operations also include generating a bit vector for the given state by:
  selecting either a bit vector of the first previous state or a bit vector of the second previous state based on which of the first edge or second edge corresponds to said minimum;
  selecting either a first original information bit associated with the first edge or a second original information bit associated with the second edge as a winner bit based on which of the first edge or second edge corresponds to said minimum; and
  appending the winner bit to the selected bit vector.

3. The receiver of claim 2, wherein the operations include:
  performing said determining and said generating for each state at the current time step in the trellis.

4. The receiver of claim 1, wherein the 4-point mapping is a 4-point Pulse Amplitude Modulation (PAM) mapping or a differential quadrature phase shift keying (DQPSK) mapping.

5. The receiver of claim 1, wherein said determining also includes selecting either the first AE candidate or the second AE candidate to be the AE for the given state based on which of the first edge or second edge corresponds to said minimum.

6. The receiver of claim 3, wherein the current time step is the last time step of the trellis, wherein the operations also include:
  selecting a state at the last time step of the trellis that gives a minimum value of aggregate weight, wherein the bit vector of the selected state represents the estimate for the original bit sequence.

7. The receiver of claim 3, wherein the operations also include:
  after having performed said determining and said generating for each state at the current time step, performing said determining and said generating for each state at the next time step in the trellis.

8. A receiver for jointly performing Viterbi decoding and decision feedback equalization, the receiver comprising:
  front end circuitry configured to receive an RF signal from a transmission medium, and convert the RF signal to a sampled signal, wherein the RF signal carries an original bit sequence in encoded form;
  digital circuitry configured to perform operations, wherein the operations include determining an aggregate weight (AW) and an aggregate error (AE) for a given state at a current time step in a trellis,
    wherein the AW of the given state is used to obtain an estimate of the original bit sequence,
    wherein the AW of the given state is a minimum of AW candidates for corresponding edges terminating on the given state,
    wherein, for each of the edges terminating on the given state, the corresponding AW candidate is a sum of an aggregate weight of a source state of the edge and one or more weights for one or more aggregate errors associated with the edge,
    wherein, for each of the edges terminating on the given state, the one or more aggregate errors associated with the edge are computed based on an aggregate error of the source state of the edge and one or more edge errors for the edge; and
  outputting the estimate of the original bit sequence.

9. The receiver of claim 8, wherein the trellis is defined by a binary convolutional code of rate ½ and a 4-point mapping.

10. The receiver of claim 8, wherein the 4-point mapping is a 4-point Pulse Amplitude Modulation (PAM) mapping or a differential quadrature phase shift keying (DQPSK) mapping.

11. The receiver of claim 8, wherein the trellis is defined by a binary convolutional code of rate ½ and a BPSK mapping.

12. The receiver of claim 8, wherein the aggregate error for the given state is equal to one of said one or more aggregate errors associated with a selected one of the edges terminating on the given state.

13. The receiver of claim 8, wherein the number of said edges terminating on the given state is two.

14. The receiver of claim 8, wherein the RF signal is a Bluetooth-compliant signal.

15. A method for operating a receiver to jointly perform Viterbi decoding and decision feedback equalization, the method comprising:
  receiving an RF signal from a transmission medium, and converting the RF signal to an input signal, wherein said receiving and said converting the RF signal are performed by front end circuitry of the receiver, wherein the RF signal carries an original bit sequence in encoded form;
  performing operations using digital circuitry of the receiver, wherein the operations include determining an aggregate weight (AW) and an aggregate error (AE) for a given state at a current time step in a trellis,
    wherein the AW of the given state is used to obtain an estimate of the original bit sequence,
    wherein the AW of the given state is a minimum of AW candidates for corresponding edges terminating on the given state,
    wherein, for each of the edges terminating on the given state, the corresponding AW candidate is a sum of an aggregate weight of a source state of the edge and one or more weights for one or more aggregate errors associated with the edge,
    wherein, for each of the edges terminating on the given state, the one or more aggregate errors associated with the edge are computed based on an aggregate error of the source state of the edge and one or more edge errors for the edge; and outputting the estimate of the original bit sequence.

16. The method of claim 15, wherein the trellis is defined by a binary convolutional code of rate ½ and a 4-point mapping.

17. The method of claim 15, wherein the 4-point mapping is a 4-point Pulse Amplitude Modulation (PAM) mapping or a differential quadrature phase shift keying (DQPSK) mapping.

18. The method of claim 15, wherein the trellis is defined by a binary convolutional code of rate ½ and a BPSK mapping.

19. The method of claim 15, wherein the aggregate error for the given state is equal to one of said one or more aggregate errors associated with a selected one of the edges terminating on the given state.

20. The method of claim 15, wherein the number of said edges terminating on the given state is two.

* * * * *